(12) United States Patent
Andersen

(10) Patent No.: US 11,574,033 B2
(45) Date of Patent: *Feb. 7, 2023

(54) DIGITAL IDENTITY AUTHENTICATION AND VERIFICATION SYSTEM, METHOD, AND DEVICE

(71) Applicant: The Boogie Badge, Inc., Draper, UT (US)

(72) Inventor: Robert Andersen, Henderson, NV (US)

(73) Assignee: THE BOOGIE BADGE, INC., Draper, UT (US)

( * ) Notice: Subject to any disclaimer, the term of this patent is extended or adjusted under 35 U.S.C. 154(b) by 950 days.

This patent is subject to a terminal disclaimer.

(21) Appl. No.: 16/293,591

(22) Filed: Mar. 5, 2019

(65) Prior Publication Data
US 2019/0332754 A1    Oct. 31, 2019

Related U.S. Application Data

(60) Provisional application No. 62/733,776, filed on Sep. 20, 2018, provisional application No. 62/669,552, (Continued)

(51) Int. Cl.
| | |
|---|---|
| G06K 5/00 | (2006.01) |
| G06F 21/32 | (2013.01) |
| G06F 21/35 | (2013.01) |
| G06K 7/10 | (2006.01) |
| G06K 7/14 | (2006.01) |
| G06K 19/07 | (2006.01) |
| H04L 9/40 | (2022.01) |

(Continued)

(52) U.S. Cl.
CPC .............. *G06F 21/32* (2013.01); *G06F 21/35* (2013.01); *G06K 7/10297* (2013.01); *G06K 7/1417* (2013.01); *G06K 19/0723* (2013.01); *G06V 40/1365* (2022.01); *G06V 40/19* (2022.01); *G06V 40/30* (2022.01); *G06V 40/70* (2022.01); *H04L 63/0884* (2013.01); *G06F 2221/2115* (2013.01)

(58) Field of Classification Search
CPC . H04L 9/3247; H04L 2209/38; H04L 9/3229; G06F 21/31; G06F 21/34
USPC .......................... 235/380, 382, 492, 462.46
See application file for complete search history.

(56) References Cited

U.S. PATENT DOCUMENTS 5,976,042 A * 11/1999 LaMarche .............. A63B 67/14
473/588
8,677,116 B1 * 3/2014 Bicer .................. H04L 63/0838
713/168

(Continued)

*Primary Examiner* — Daniel St Cyr
(74) *Attorney, Agent, or Firm* — Terrence J. Edwards; TechLaw Ventures, PLLC

(57) ABSTRACT

This disclosure generally relates to a method for authenticating a user in a digital or physical environment. The method includes receiving an identity verification request based on input provided by a user to be verified, receiving a facial and audio recognition sample from the user, transmitting the facial and audio recognition sample to one or more third party entities with a request to verify that the facial and audio recognition sample represents the user, receiving an indication from at least one of the third party entities that the user is verified, and verifying that the user who provided the facial and audio recognition sample is the person the user purports to be.

20 Claims, 13 Drawing Sheets

Related U.S. Application Data filed on May 10, 2018, provisional application No. 62/638,733, filed on Mar. 5, 2018.

(51) Int. Cl.
  *G06V 40/19* (2022.01)
  *G06V 40/30* (2022.01)
  *G06V 40/70* (2022.01)
  *G06V 40/12* (2022.01)

(56) References Cited

U.S. PATENT DOCUMENTS

| | | | |
|---|---|---|---|
| 9,721,147 B1* | 8/2017 | Kapczynski | G06Q 50/265 |
| 2003/0194071 A1* | 10/2003 | Ramian | H04M 17/106 |
| | | | 379/114.19 |
| 2009/0163175 A1* | 6/2009 | Shi | H04W 12/069 |
| | | | 455/411 |
| 2014/0214670 A1* | 7/2014 | McKenna | G06Q 20/4014 |
| | | | 705/44 |
| 2016/0129348 A1* | 5/2016 | Yacenda | A63F 13/48 |
| | | | 463/29 |
| 2016/0301689 A1* | 10/2016 | Roy | H04W 12/082 |
| 2019/0057472 A1* | 2/2019 | Ross | G06Q 50/2053 |
| 2019/0156079 A1* | 5/2019 | Espinosa | G08C 17/02 |

* cited by examiner

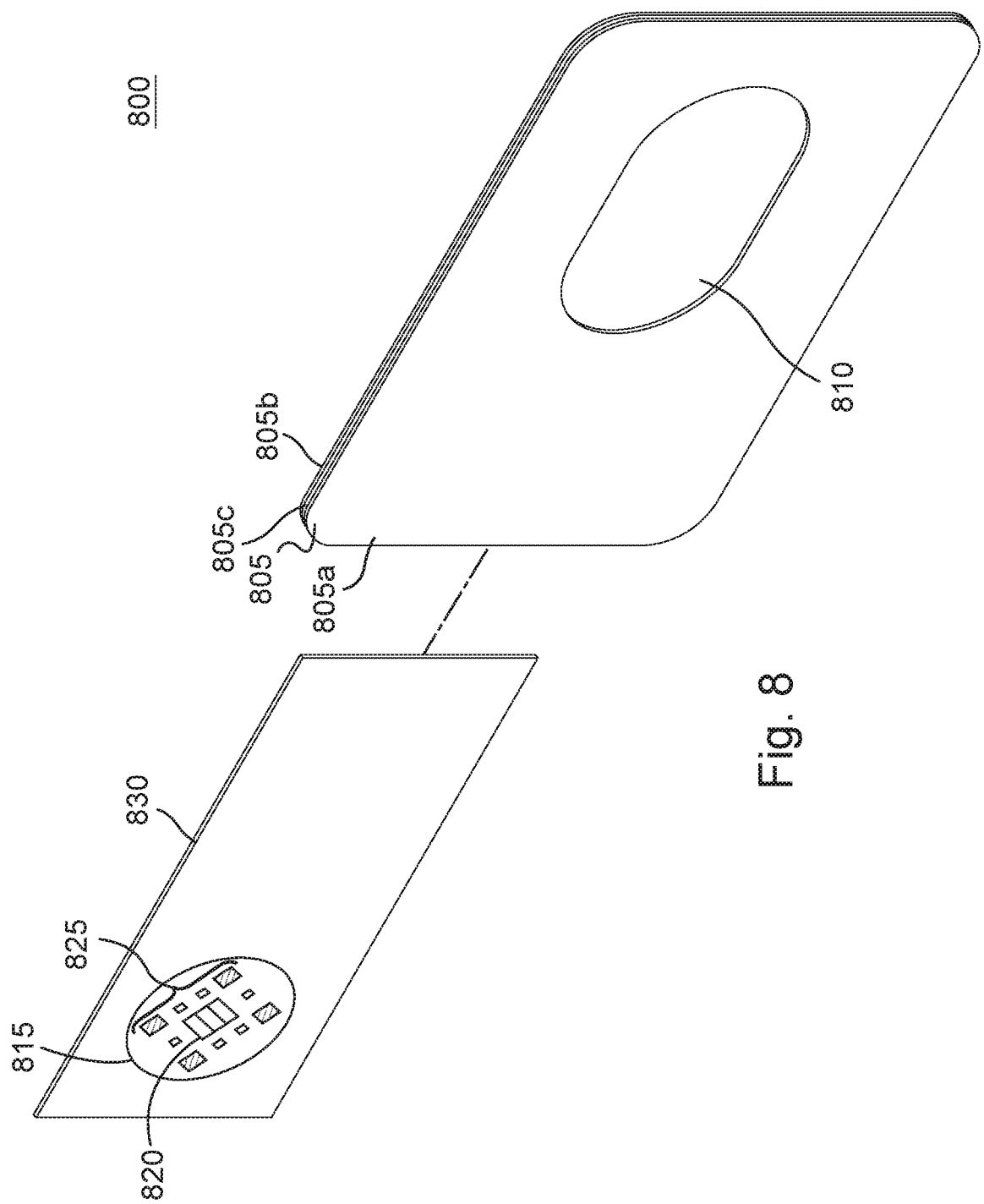

DIGITAL IDENTITY AUTHENTICATION AND VERIFICATION SYSTEM, METHOD, AND DEVICE

PRIORITY

This application claims the benefit of U.S. Provisional Application No. 62/638,733, filed on Mar. 5, 2018, U.S. Provisional Application No. 62/669,552, filed on May 10, 2018, and U.S. Provisional Application No. 62/733,776, filed on Sep. 20, 2018, which are hereby incorporated by reference herein in their entireties, including but not limited to those portions that specifically appear hereinafter, the incorporation by reference being made with the following exception: In the event that any portion of the above-referenced provisional applications is inconsistent with this application, this application supersedes said above-referenced provisional applications.

BACKGROUND

1. Technical Field

This disclosure relates generally to a system, method, and device for authenticating and verifying a person's identity in digital and physical environments. The system includes a badge having a first side and a second side which is embedded with identification information that is read-only on a first side and read/write on the second side or read-only on a portion of the first side and read/write on a portion of the first side. The badge may be receptive to near-field communications (NFC) transmissions. The badge may interface with an NFC reader, which may, in turn, interface with a user device, which may, in turn, interface with a server or a cloud server. The system disclosed herein may perform a method for authenticating and verifying a person's identity in physical and digital environments.

2. Description of the Related Art

Authentication and verification of a person's identity has long been a problem. Since the time more people populated the Earth than could be known by one person, man has devised various ways of ensuring a person is who the person purports to be. Historically tokens given by a well-known individual served to identify a person as a trusted emissary of the well-known individual. Other civilizations have relied on wax imprints of rings worn on a person's finger as a form of authentication on a document which shows that the document is authorized and verified by the owner of the ring. Other civilizations have relied on devices known as chops which are inscribed with the name or a symbol of a person and which may stamp the person's name or symbol after the inscription is treated with ink. Handwritten signatures eventually replaced these other methods of identity authentication and verification as a degree of skill possessed by very few people is required to mimic the handwriting of another person.

More recently, governments have issued picture identification cards which are issued when a person has provided sufficient documentation to meet the governmental authority's prescribed rules for obtaining a picture identification. These picture identification cards have served to also provide additional information about the person associated with the card, including an age of the person associated with the card and a physical description of the person associated with the card. Unfortunately, these picture identification cards have become subject to forgery by unscrupulous individuals to confer a false identity on certain people for the purpose of making the person appear to be older than they are, to provide the person with an alias for nefarious purposes, or to otherwise cause another person to believe the bearer of the card is someone different than who the bearer of the card purports to be.

With the advent of the Internet, a digital environment was created where the concept of identity has become obscured by online alias names or handles. Since, in a digital environment people lack physical characteristics, a person's identity may be fluid, changing at a particular person's whim. Other internet users in the digital environment may find it difficult to identify and trust various users because something may seem strange about the particular user. Unfortunately, a sense of strange behavior or writing is frequently a minimally useful process to authenticate and verify a person's identity. Some digital environments are password protected, which means that only a person who knows the password for a certain user may access privileges and abilities owned by the user associated with a particular digital identity associated with the password.

Current authentication methods take a similar approach to authentication and tend to remain static. Some unscrupulous individuals may, therefore, know exactly how a particular protocol authenticates and provides access to a service for the service's users. One solution to this problem has been the use of two factor authentication which requires two different pieces of information to authenticate a user to a system and provide the user access to the system. For example, a banking service may require a username and a password, as a first authentication, to log in and then further require an answer to a security question as a second authentication. However, once a two factor authentication service is in place, the person's user name and password rarely, if ever, change and the security questions remain the same for, in most cases, a long period of time—5-10 years, or more. This allows unscrupulous individuals plenty of time and opportunity to hack a person's username and password and any other security questions, giving the unscrupulous individuals access to virtually all of a user's accounts. Adding additional authentication factors makes guessing correct answers more difficult and slight variations in the answers from the correct answers can create notifications that someone is attempting unauthorized access to a service or system.

However, two factor authentication may be difficult to manage because users generally have a limited ability to change a log-in method for a given web portal. Further, the use of separate login credentials, different login devices, authentication settings, and other management efforts for every access point can be profoundly complex from a management perspective. For example, users frequently fail to correctly and accurately maintain their login credentials or wish to log in to a service from separate and different devices while failing to remember their login credentials. Other users fail to even implement authentication settings, leaving them more exposed to unscrupulous individuals.

Accordingly, in many contexts, it may be incredibly difficult to identify a particular person through the Internet. For example, a person's email service may be hacked, meaning the person's password may be obtained without the user's permission, and the hacker may send emails that purport to be from a particular person with a known address, but which are not actually sent by the person. In another context, a person may employ a technique known as a phishing scheme to cause a user to interact with an item in a web page or an email that causes the user to download harmful software that provides another person access to the information stored in the user's device. Examples of these phishing schemes include ransom ware, trojan horse viruses, computer viruses, malware, keystroke tracking, and a host of other nefarious computer programs that put a person's personal information in jeopardy.

Accordingly, a need exists for a device which can uniquely identify a particular person in a digital environment. Similarly, a need exists for a system which may be accessible by a plurality of users that allows a user to verify and authenticate the person's identity in a manner that is trusted by other users of the system. Similarly, a need exists for a method of authenticating and verifying a user who desires access to the system. A further need exists for providing customizable and adaptive authentication systems which allows a user's creativity and psychological individuality to contribute to higher security in a user-friendly manner.

It is one object of this disclosure to provide a badge device which includes a first side containing information that is read-only and a second side containing information that may be read and written such that the data on the second side may be altered or read-only on a portion of a first side and read-write on a portion of a first side. It is another object of this disclosure to provide a system which may be used to verify a person who possesses the badge by providing an NFC reader to read the badge and transmit information to a device which may access a cloud server or a cloud network to verify the possessor of the badge. It is another object of this disclosure to provide a method for authenticating a user who desires access to the system. It is a further object of this disclosure to provide an anti-phishing service by confirming, via the cloud server or cloud network, that a website or an email is authentic. It is an additional object of this disclosure to provide a system which allows a user to resist hacking efforts by psychological individuality instead of relying on a new technical solution designed to meet the last unscrupulous hacking innovation.

SUMMARY

Disclosed herein is a method for verifying an identity of a user. The method includes receiving an identity verification request based on input provided by a user to be verified, receiving a facial and audio recognition sample from the user, transmitting the facial and audio recognition sample to one or more third party entities with a request to verify that the facial and audio recognition sample represents the user, receiving an indication from at least one of the third party entities that the user is verified, and verifying that the user who provided the facial and audio recognition sample is the person the user purports to be.

Also disclosed herein is a method for verifying an identity of a user. The method includes receiving an identity verification request based on input provided by a user to be verified, receiving a facial and audio recognition sample from the user, receiving an indication that the user in the facial and audio recognition sample is unrecognizable, examining the behavioral biometrics of the identity verification request, requesting a second facial and audio recognition sample from the user, transmitting the second facial and audio recognition sample to the one or more third party entities, receiving an indication from at least one of the third party entities that the user is verified, and verifying the user who provided the facial and audio recognition sample is the person the user purports to be.

BRIEF DESCRIPTION OF THE DRAWINGS

The accompanying drawings illustrate various embodiments of the digital identity authentication and verification system, method, and device disclosed herein.

FIG. 8 illustrates another exemplary embodiment of a badge that provides RFID/NFC communication functionality.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
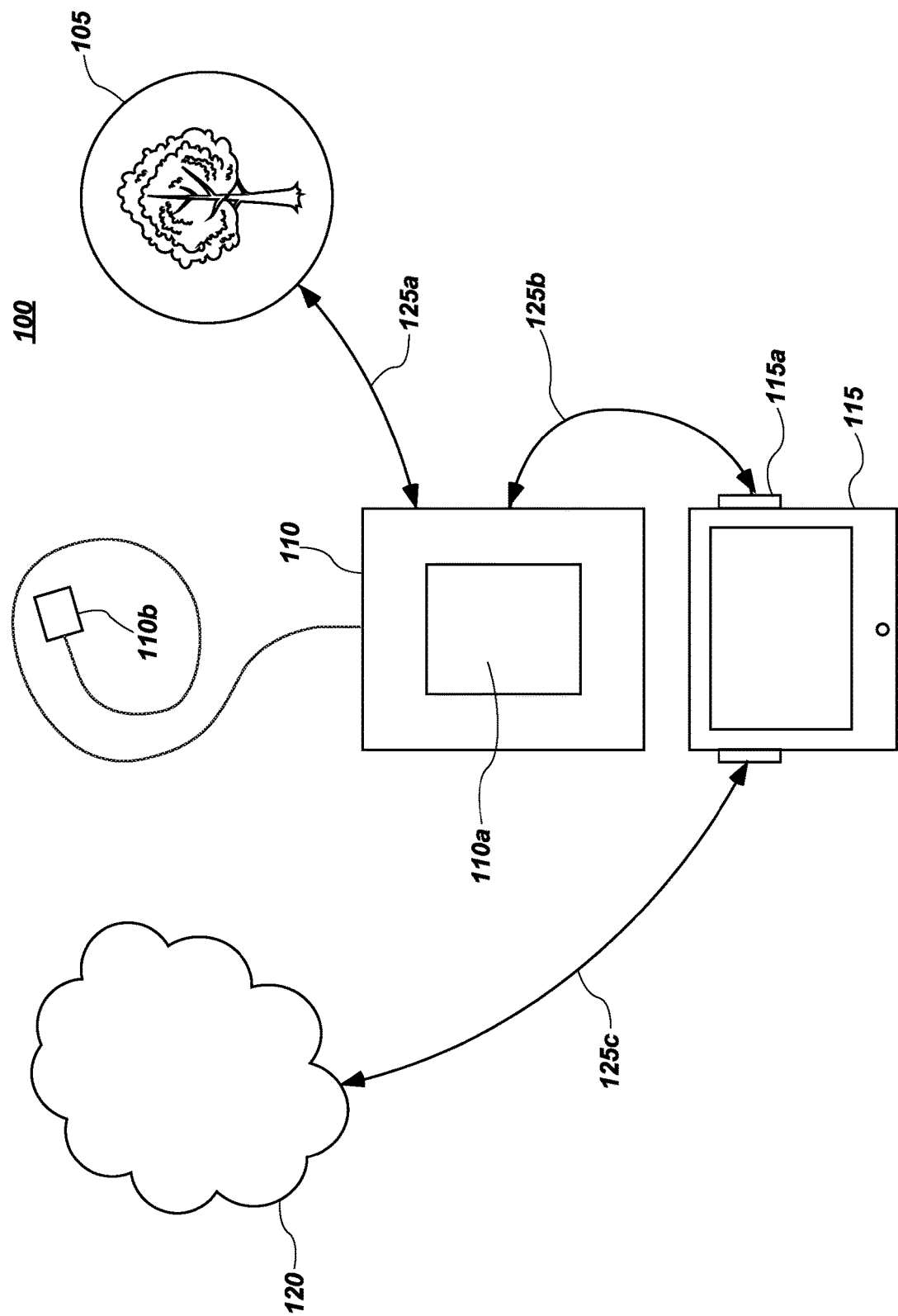
FIG. 1 illustrates an exemplary system for identifying and authenticating a user.

FIG. 1 illustrates an exemplary system 100 for identifying and authenticating a user within system 100 by means of a badge 105. Badge 105 will be discussed in more detail below. However, badge 105 may be implemented as a device having a first side and a second side or just a first side. The first side of the badge 105 may include a read only NFC communication tag. The second side of badge 105 may include a read/write NFC communication tag. Alternatively, badge 105 may be implemented with a read-only NFC tag on a first portion of the first side and/or with a read-write NFC tag on a second portion of the first side. In this manner, badge 105 may include information that is permanently associated with badge 105 while also including information that may be changed to suit a particular purpose. Badge 105 is shown as including an image of a tree, which is only a representation of a digital security image contained within one of the front side of badge 105 or the back side of badge 105. In one embodiment, a user may select a particular security image to represent to the user that identity authentication and verification and other security protocols are in place when the user sees the image on, for example, the screen of an electronic device. Further, the image of the tree, as used herein, is merely representative of the concept. Other implementations may use any other image of a person, a thing, or any other recognizable image. This concept and badge 105 will be addressed in further detail below.

System 100 further provides an NFC reader 110. In one embodiment, the NFC reader may include a surface 110a for interfacing with badge 105 by receiving information contained within badge 105 and transmitting information to badge 105 using conventional NFC protocols. In one embodiment, NFC reader 110 may include a connector 110b for connecting to electronic device 115 via communication port 115a. In one implementation, for example, NFC reader 110 may include a USB connector as connector 110b which corresponds to a USB port implemented as communication port 115a. However, any suitable communication protocol, including wireless communication protocols, may be implemented to allow NFC reader 110 to connect to and communicate with electronic device 115. NFC reader 110 may be implemented within electronic device 115, for example. Examples of electronic device 115 include desktop computers, laptop computers, tablets, game consoles, personal computers, notebook computers, smart phones, and any other electronic device capable of interfacing with both NFC reader 110 and a server computer 120. Electronic device 115 may include software and hardware modules, sequences of instructions, routines, data structures, display interfaces, and other types of structures that execute computer operations. Further, hardware components may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within electronic device 115 may be used to execute the various identification and authentication methods, protocols, or events described herein. Electronic device 115 may be a computing device for a particular application such as facilitating a sale of a product to a consumer or may be implemented as a user computer depending on various specific implementations of this disclosure.

Server 120 may be implemented as one or more of cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to facilitate communication between electronic device 115 and server 120. Server 120 may include software and hardware modules, sequences of instructions, routines, data structures, display interfaces, and other types of structures that execute server computer operations. Further, hardware components within server 120 may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within server 120 may be used to execute the various methods or algorithms disclosed herein and interface with electronic device 115.

As discussed herein, various elements of system 100 may interface and communicate with other elements of system 100. For example, badge 105 may interface and communicate with NFC reader 110 via a communication protocol 125a, such as an NFC communication protocol. Similarly, NFC reader may further interface and communicate with electronic device 115 via a communication protocol 125b, such as a wired USB connection. Electronic device 115 and server 120 may further interface and communicate with each other using a communication protocol 125c, which may include a wired ethernet connection or a wireless 802.11x connection. However, communication protocols 125a, 125b, and 125c may use any suitable communication protocol known in the art and are not limited to the exemplary implementations described herein. For example, any of communication protocol 125a, 125b, and 125c may be implemented using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, NFC communication protocols, or any other appropriate protocol to facilitate communication between the various components of system 100.

While additional benefits of system 100 will be discussed below, it is to be noted that badge 105, which may be a physical badge or an electronic badge, may be customizable to a user. A user may determine what acceptable forms of verification are suitable to meet the user's security requirements. For example, a user may require that a physical badge and a thumbprint may be required for physical authentication. At the same time, a user may require that an electronic badge requires voice recognition and facial recognition to verify the user to the system. In the case of an electronic badge, the badge may be stored in an electronic device, such as a smart phone.

Figure 2:
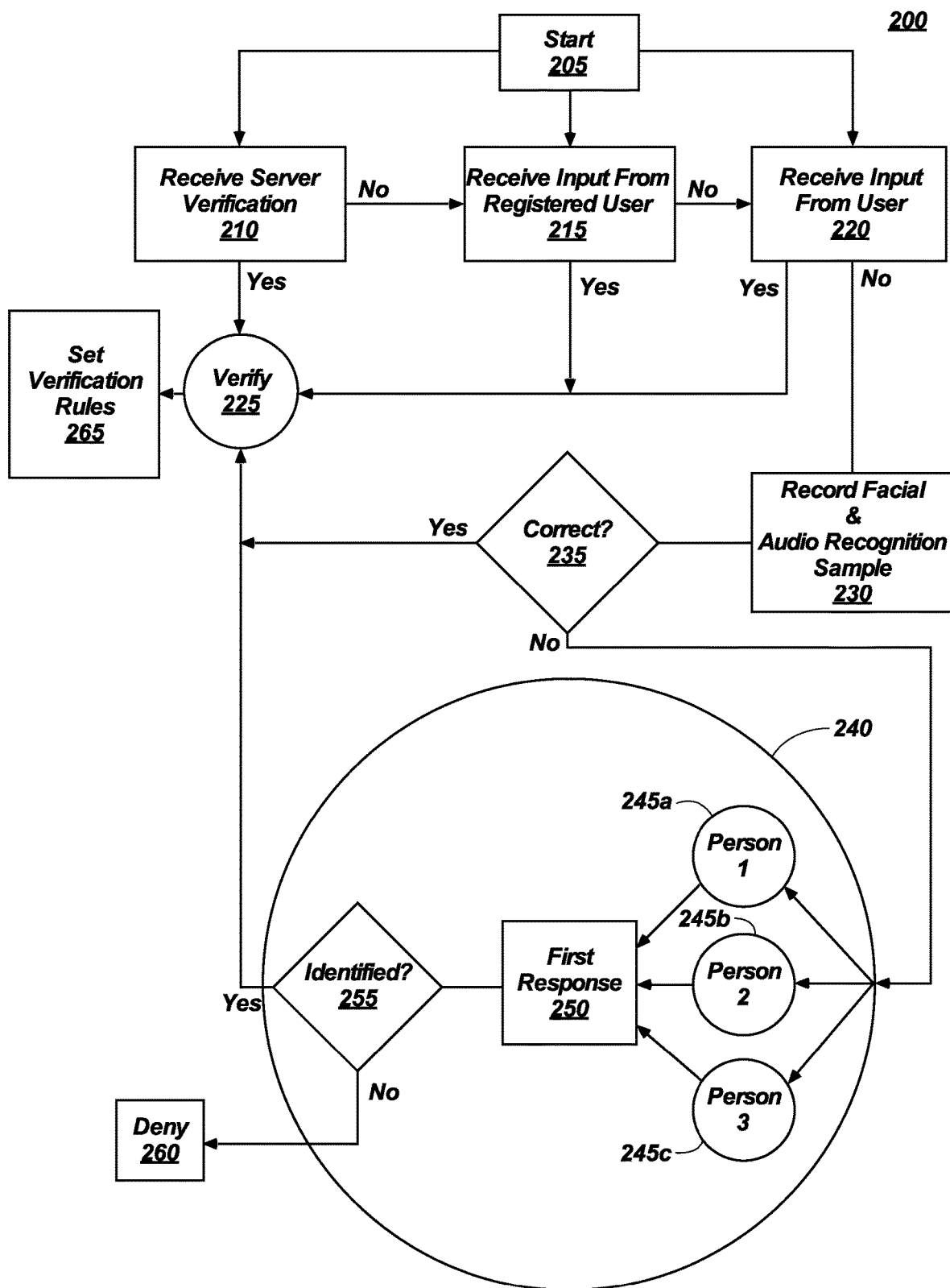
FIG. 2 illustrates an exemplary method for authenticating a user to the system.

FIG. 2 illustrates an exemplary method 200 for authenticating a user to a user identification and authentication system, such as system 100, shown in FIG. 1. FIG. 2 begins by receiving an indication, at step 205, that a user desires to register with or verify/authenticate the user's identity to system 100. While the same or similar process may be used to register a new user with system 100, method 200 is described in terms of a real-time user authentication/verification for a particular purpose, such as sending an email or posting content on an internet chat board, for example. Further, it is noted that server 120, shown in FIG. 1, may execute method 200 by performing any of steps 210, 215, and 220, as a first step in method 200. For example, if server verification is not possible, server 120 may begin with step 215. However, if a user is requesting authentication or verification from a non-registered device, server 120 may begin method 200 at step 215. Notwithstanding, method 200 is described herein as beginning with step 210, although there are implementations where method 200 may begin at step 215 or step 220.

In one embodiment, a request for authentication may be received at step 205 from a device, a server plugin, a web browser, a browser plugin, an application plugin, an app, or a particular computing device. Server 120 may determine a verification strategy for verifying the identity of a particular user based on the server's preferences, an organization's settings, or user settings. At step 210, server 120 may receive server verification information. For example, server 120 may dynamically receive encrypted information contained within badge 105. Server 120 may further perform a GPS (global positioning satellite) location analysis for the particular user requesting identity authentication and verification by detecting where an electronic device 115 associated with the user, or registered to the user, is located. For example, if a user is shown, by the GPS location analysis to be inside a home where the user has been known to system 100 to reside, system 100 may use that information in a determination as to whether or not the user should be authenticated and verified by system 100. Server 120 may further perform a psychometric analysis to determine whether or not a request to verify or authenticate a user conforms with the user's habits or other data. For example, if the user is known by server 120 to request authentication and verification everyday or every work day within a one-hour window at a specific GPS location, server 120 may factor that information in to determine whether or not to authenticate/verify the user's identity to system 100. If at step 210, system 100 determines that the user's request for authentication should be authenticated/verified (step 210—yes), the user is verified at step 225. If at step 210, system 100 determines that the user's request for authentication should not be authenticated/verified by the processes discussed with respect to 210 (step 210—No), method 200 proceeds to step 215.

At step 215, server 120 may receive input from a registered device associated with a known user. For example, server 120 may receive authorization information from a user device using a two-step system. For example, server 120 may transmit a code to a user device, such as electronic device 115, which the user must input and retransmit to server 120. Server 120 may further identify a registered device by sending a telephone call or a text message to the device or by transmitting a code to a merchant or other identity requestor and to the user to perform an in-person authentication/verification. For example, the identity requestor may be provided with a standard code which may be sent to a user's registered device, such as electronic device 115, which the user may then provide to the identity requestor as confirmation that the user associated with the registered device is an authenticated/verified user. If, based on the input received by server 120, the user can be authenticated/verified through the use of the user's registered device (215—Yes), the user is authenticated/verified at step 225. If, based on the input received by server 120, the user cannot be authenticated/verified through the use of the user's registered device (215—No), method 200 proceeds to step 220.

At step 220, server 120 may receive input from a user to authenticate that the user is who the user purports to be when using an unregistered device (a public computer, for example). For example, server 120 may request a password from the user to authenticate the user's identity. Alternatively, server 120 may request a pin number from the user to authenticate the user's identity or server 120 may further request the user complete a drawing known to the user to authenticate the user's identity. If the user is able to provide this information (220 yes), the user may be authenticated at step 225. However, if the user is not able to provide this information at step 220 (220—No), server 120 may request that the user record a video of the user saying a particular word or phrase or take a picture of the user's face. Server 120 may, at step 230, attempt to perform facial recognition of the registered user based on the received video or picture of the user's face. If server 120 is able to assess that the picture of the user is a picture of the correct user or the user has correctly said the specified word or phrase at step 235 (step 235—Yes), the user may be authenticated/verified at step 225. If server 120 is unable to authenticate/verify the user at step 235 (Step 235—No), server 120 proceeds to a relationship based verification 240.

Relationship based verification is essentially a verification by friends, family, acquaintances, colleagues, or other people who can verify/authenticate that a person is who the person purports to be based on their personal relationship with the person who intends to verify or authenticate his identity. These people may be identified as potential authenticators by providing server 120 with access to a contact list of people and phone numbers within an electronic device associated with a user, such as electronic device 115, discussed above with respect to FIG. 1. Accordingly, at step 245a, step 245b, and step 245c, server 120 may transmit the picture or the video submitted by the user at step 230 to a first person, a second person, and a third person at steps 245a-245c, respectively. The transmission from server 120 to the first, second, and third persons may include a request to authenticate that the person shown in the picture is the person known to them by the same name. Alternatively, server 120 may request by this transmission that the first, second, and third persons confirm that the person seeking identity verification/authentication is saying a predetermined word or set of words in the video submitted to server 120 by the person.

Server 120 may receive an indication from the first one of the first, second, and third persons at step 250, that the picture or video transmitted to them by server 120 is or is not the person who is known to them by a particular name. If the first responder at step 250 identifies the person (the user) as being the person who is requesting authentication/verification, the server authenticates the user at step 225. If the person is not identified by any of the first, second, or third persons, method 200 ends at step 260, failing to authenticate a user. Other similar authentication techniques may be used to verify and authenticate a user such as fingerprints, signature scanning, electrocardiogram scanning, retina/iris/eye movement scanning, vein recognition, ear scanning, palm scanning, voice recognition, face recognition, video recognition, relationship assisted verification (e.g., a recorded face and video); relationship assisted verification (live voice and video), transcription matching, thumb prints, metal key card, intermittent microphone-voice recognition, intermittent camera-face recognition, behavioral biometrics keyboard pattern recognition, smart phone application usage, smart phone usage, and login/access behaviors.

Finally, once an individual or an organization is verified to the system at step 225, server 120 may allow the individual/organization to customize adaptive authentication requirements for subsequent access to the system via server 120 at step 265. For example, a user may select an authentication process or test that is based on the user's preferences, the server's preferences, an organization's settings, or other user settings. These selected authentication processes or tests may be based on what is easiest, what makes the user feel safest, what is most convenient, what provides the most overall satisfaction to a particular user at a particular time. Further, the user, be it an individual or an organization, may have the ability to selectively change, customize, or update the authentication process at any time to ensure that only those who are intended to have access to a service actually get access to the service.

For example, a company which verifies itself through process 200, may customize which authentication methods are required for a user to authenticate to a company's system. One of the company's security managers, for example, may require additional authentication method for certain tasks (e.g., logging in, accessing email, accessing company documents, accessing company financial records, accessing human resources information, accessing payroll information, etc.). Once the company's security manager selects authentication mechanisms, those mechanisms may be imposed on any user who attempts to gain access to the company's system. Further, any authentication method disclosed herein may be selectively implemented by the system. For example, in one embodiment, a company security manager may determine that anyone with an email address that uses the company's domain "exampleuser@company.com" may log into the email system with a username and password. However, if that user wishes to access the company's documents, another one or more authentication tests or mechanisms may be presented to the user such as facial recognition, the relationship based verification algorithm, GPS location, biometric scanning, third party application protocol interfaces, or any other authentication test or mechanism known in the art. Any combination of authentication tests and methods may be implemented in the company to ensure that the intended access to the company's system is legitimate or is at least thorough enough to ensure that the risk of unauthorized access by an unscrupulous individual is minimal.

In a more specific example, an auto dealer or a major credit card servicer may use process 200 to require that any user who wishes to make a large purchase, for example, (a purchase over a certain threshold in dollar terms) provide at least one additional authentication response prior to completing the transaction. For example, a user may be required to provide a signature for comparison match, and a randomly selected one of the other authentication tests/methods disclosed herein. Thus, the user may be required to also provide a fingerprint match, answer a security question, send a relationship based verification request to a randomly selected group of contacts in a user's smart phone, or etc.

Finally, step 265 allows an individual/organization to selectively require that a user be continuously authenticated during their entire session of access to a particular service. For example, an exemplary company may determine that anyone who has access to a particular service or portion of a service (e.g., financial documents) must also submit to keystroke monitoring and/or other similar methods of tracking throughout their authenticated session. In this manner, security technicians may be able to monitor both in real time or afterwards what a particular user was doing during an authenticated session. In this manner it may be possible to identify unscrupulous individual who may have gained access to the service illegitimately and immediately ascertain the damage done by that illegitimate access to the service.

Finally, authentication in process 200 may be adaptive and use artificial intelligence techniques to change an authentication strategy in response to certain conditions. For example, if a user authenticates to the system in a manner that is unknown or less likely to be legitimate, server 120 at step 265 may adapt to the authentication request and request a more challenging or more difficult authentication test or mechanism. Or, for example, if server 120 determines that the user requesting access to the service is outside of a normal area based on GPS location, server 120 may selectively and intelligently adapt to provide more layers of authentication before the user gains access to the service. In this manner, an unscrupulous individual may be stymied by psychological tactics because the unscrupulous individual may not know what to expect for selective authentication due to the adaptive nature of the authentication tests and mechanisms. Guessing which test the unscrupulous individual must pass to gain access is drastically more difficult to prepare for which makes an unscrupulous individual far less likely to gain legitimate access to a service.

Figure 3A:
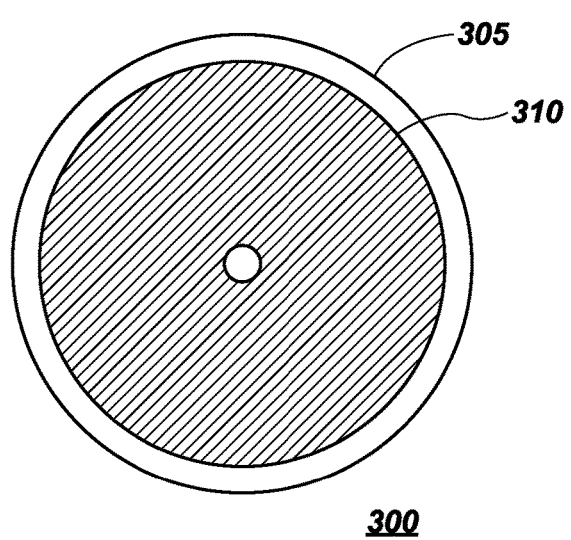
FIG. 3a illustrates an exemplary badge that contains read-only identity authentication information on a front side.
Figure 3B:
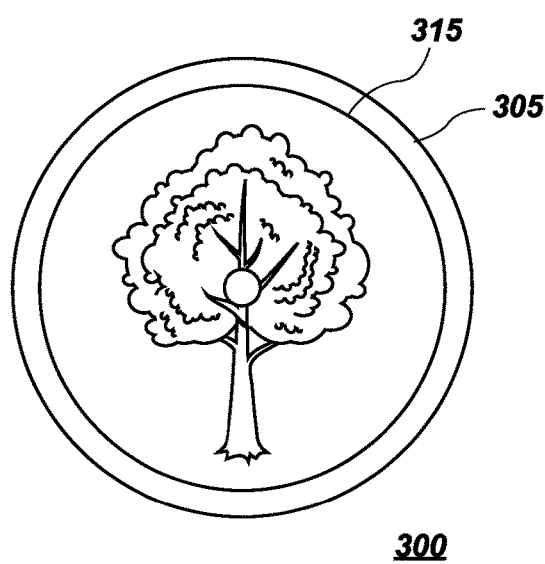
FIG. 3b illustrates an exemplary badge that contains read/write identity authentication information on a back side.

FIG. 3a illustrates an exemplary badge 300 that contains read-only identity authentication information on a front side 310 of a disc 305. It is noted that badge 300 need not be implemented as disc 305. Rather, badge 300 may be implemented as any other NFC antenna containing apparatus. Exemplary implementations of badge 300 may include a wrist band, a wrist watch, a ring, a card, or any other device capable of receiving an NFC antenna containing apparatus and are not limited to specifically a disc. FIG. 3b illustrates an exemplary badge 300 that contains read/write identity authentication information on a back side 315 of disc 305. As shown in FIGS. 3a and 3b, badge 300 is implemented as a physical two-sided badge, which is also shown and discussed above with respect to FIG. 1 as badge 105, although a badge where information, both read-only and read/write, may be encoded on one side of the badge. Badge 300 may contain information that may be digitally encrypted. For example, front side 310 or a first portion of front side 310 of badge 300 may include a read-only NFC sticker that is applied to front side 310 of badge 300 and includes information that uniquely identifies a person as a particular user. The information that uniquely identifies the person as a particular user may include a read-only code that is matched with a user during registration. The read-only code may or may not be a permanent representation of a person's physical badge 300 code. However, in the event that badge 300 is lost, compromised, or becomes defective, badge 300 may be disconnected and replaced with another badge 300 that includes different information (i.e., a different read-only code) that still uniquely identifies the particular user. Thus, this data is stored within badge 300 in a read-only format such that the user's identity information cannot be changed on badge 300, although the data stored within badge 300 in a read-only format may be replaced, as noted above. At the same time, back side 315 of badge 300, or another portion of front side 310 includes rewritable information that includes a keycode. For example, back side 315 of badge 300 may include a read/write NFC sticker that is applied to back side 315 of badge 300 and include keycode information that uniquely identifies a particular user for a particular transaction. When the keycode is read by, for example, an NFC reader, such as NFC reader 110, shown in FIG. 1, the NFC reader may write a new keycode for a new identification process. When the user presents badge 300 to be identified, system 100, shown in FIG. 1, may determine that the keycode stored on backside 315 of badge 300 matches the keycode that was written to backside 315 of badge 300 in a previous interaction with the NFC reader. Thus, system 100 recognizes the bearer of badge 300 as an authenticated/verified user of system 100.

As shown in FIG. 3b, badge 300 may further include an image of a tree on badge 300 as a representation that badge 300 may also be implemented digitally in a non-physical manner. During registration, a user may select a personalized security image which may be displayed on a screen of an electronic device, such as electronic device 115 shown in FIG. 1, to assure the user that a particular website, email, or other internet content is authentic. Implementations of the digital badge 300 are discussed below, particularly with respect to FIG. 5 and FIG. 6.

Figure 4:
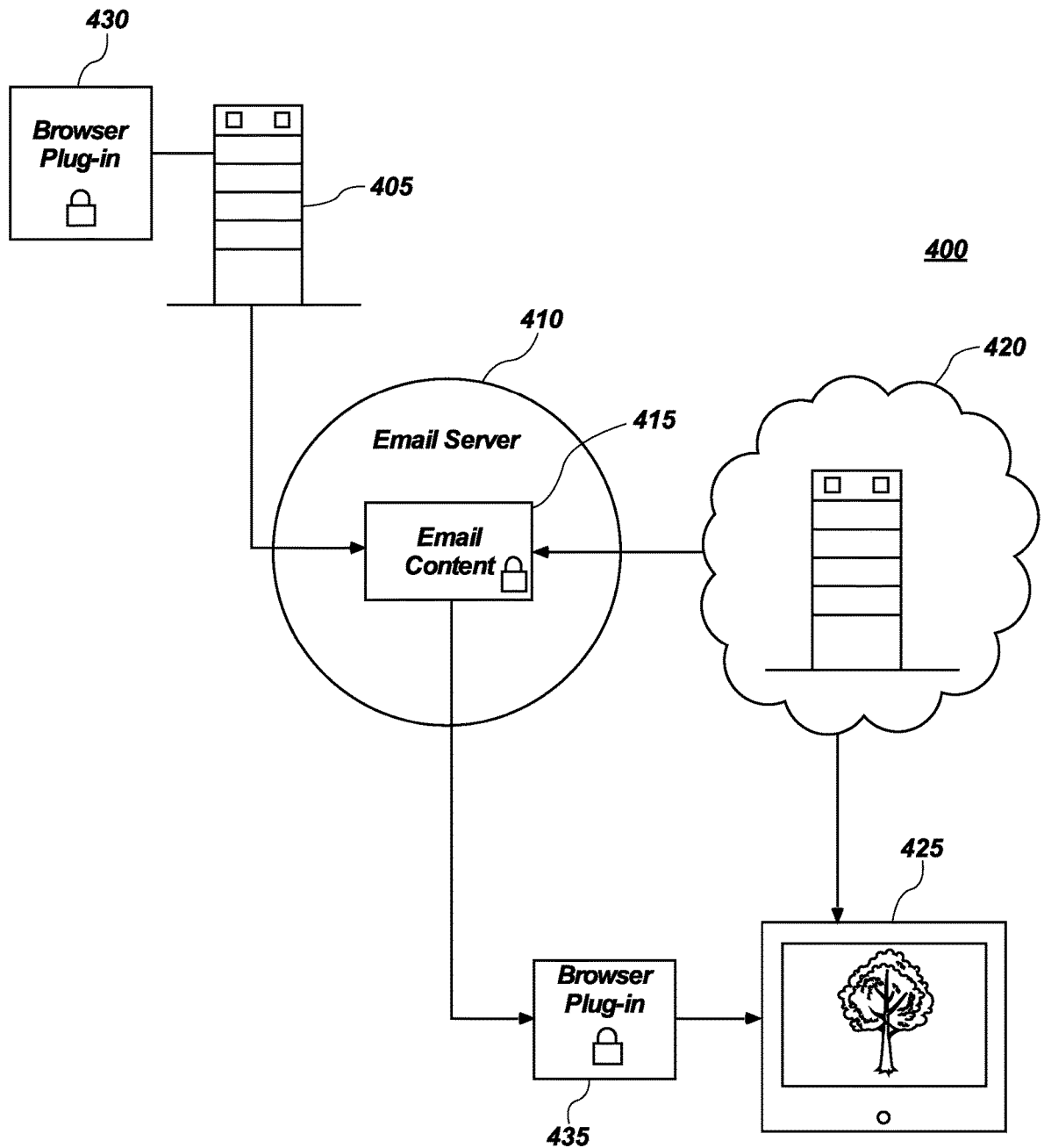
FIG. 4 illustrates an exemplary system for authenticating digital content.

FIG. 4. illustrates an exemplary system 400 for authenticating digital content. As described with respect to FIG. 4, email is an example of digital content. However, digital content suitable for use in system 400 may include internet content, HTML content, social media posts, online reviews, video content, and any other content that may be provided to an internet-based audience that is generated by a specific user. As shown in FIG. 4, an entity such as an organization, a business, a person, or other entity may, via a computer 405 provide digital content, such as an email in this example, for sending to another person. Computer 405 may include a browser plugin or extension 430. In this example, a server 410, such as an email server, may communicate with a cloud server 420 to authenticate the entity that has provided the digital content 415. Cloud server 420 may be similar in implementation and description to server 120, shown in FIG. 1 and discussed above. For example, the provider of the digital content may be authenticated using method 200, shown in FIG. 2 and by connecting an NFC reader, such as NFC reader 110 shown in FIG. 1, to read identity information from a badge, such as badge 105, shown in FIG. 1.

The user may be authenticated using the techniques described herein. Once authenticated, the user manually inserts (e.g., copy/paste) a newly created session keycode obtained from a user's account page accessible via cloud server 420. The session keycode may be inserted into the digital content in an automatic or semi-automatic fashion via software plugins, such as browser plugin 430, desktop software, phone applications, application interfaces, and etc. which may be specifically tailored or implemented for a particular web browser or digital content service. In the example of FIG. 4, the digital content is email content. Thus, for example, a user, who uses system 400 may log in to the authentication service at 9:00 am at the beginning of a work day using a web browser extension/plugin 435 on a user device 425, which may be a computer. The user may then send an email at 9:05 am and another email at 9:55 am and post a blog entry at 10:30 am. The user may then create a new account with an online auction service. In each of these transactions, server 420 may create unique session keycodes that may be inserted into the digital content (the emails, and the blog posts) for recipients of the content to see. Similarly, the online auction service may use another unique session keycode to authenticate an account created under the user's name. Once these transactions are completed, the user may log out of the system when the user leaves the computer for lunch (or any other time the user leaves the computer).

The provided digital information may be then transmitted to a recipient. The recipient may receive the provided digital content at a user device 425. User device 425 may verify the keycode placed within the digital content based on a browser extension, software, plugin, or other integration executed by user device 425. The integration provided on user device 425 may determine that the content is valid by, for example, showing a tree as the selected security image, which as described above, is the user's selected security image in this exemplary disclosure.

Thus, an authenticated user may send digital content to another user or to an organization via cloud server 420 in a manner that allows both the sender and the receiver to know that the digital content is authentic and verified as coming from a particular person or entity and that the digital content is received by the intended person or entity. In this manner specific phishing techniques are simple to detect because non-authenticated emails or digital content will fail to show the person's selected security image indicating that the information contained within a particular element of digital content may be suspect for malware, viruses, phishing, or other nefarious intent. Once the user recognizes that the digital content is not authentic, it may be easily dismissed.

In another embodiment, computer 405 may include a browser plugin 430 which may encrypt the content of an email in addition to inserting a security image into an email, as discussed above. It should be noted that the term "browser plugin" as used herein (including references to browser plugin 435 discussed below) may be interpreted broadly as any program or set of programs that provide additional functionality to computer 405. As previously discussed, a keycode, obtained from cloud server 420 may be inserted into some digital content which, in this example, is an email message, by browser plugin 430. Alternatively, and additionally, browser plugin 430 may encrypt all or some of the digital content, including the exemplary email. Further, browser plugin 430 may also selectively encrypt the keycode. Whether or not the keycode is encrypted may be based on user settings, preferences, or user interaction with computer 405. However, encrypting the keycode may also be a valuable tool against phishing exposures, as will be discussed in further detail below.

When properly encrypted, the digital content may be sent from computer 405 to user device 425, via email server 410, as previously discussed. Email server 410 may route digital content/email content 415 to user device 425. In this embodiment, cloud server 420 may or may not recognize the encrypted digital content based on whether or not browser plugin 430 encrypted the keycode in addition to encrypting the content in the email. If cloud server 420 does recognize the keycode as it has not been encrypted, cloud server 420 notifies user device 425 that the incoming email is authentic. If the keycode has been encrypted, cloud server 420 may or may not identify to user device 425 that the digital content will be arriving at user device 425.

However, in the case that the keycode has been encrypted, browser plugin 435, operated by user device 425, may seamlessly decrypt the email without further information or interaction required from the recipient. In one example, browser plugin 435 may, via user device 425, decrypt the keycode and confirm via cloud server 420 that the keycode is authentic and may then proceed to decrypt the digital content without further information or interaction required from the recipient. Since, from the user's perspective, the user would not be able to determine whether or not the email was or was not encrypted, user device 425 may provide the user with a representation of a security image, such as a tree, to inform the user that the email had been encrypted and decrypted.

This implementation does not require that a link be sent from computer 405 to user device 425 that provides the user with access to encrypted content by logging in to a secure server. Since sending links from one computer to another is a phishing exposure, encrypting the keycode and the digital content, as described herein, protects the user from unscrupulous individuals who would attempt to glean information from an unsuspecting user. Phishing attempts may therefore be defeated by removing a clickable link for accessing encrypted digital content using the foregoing system.

Figure 5:
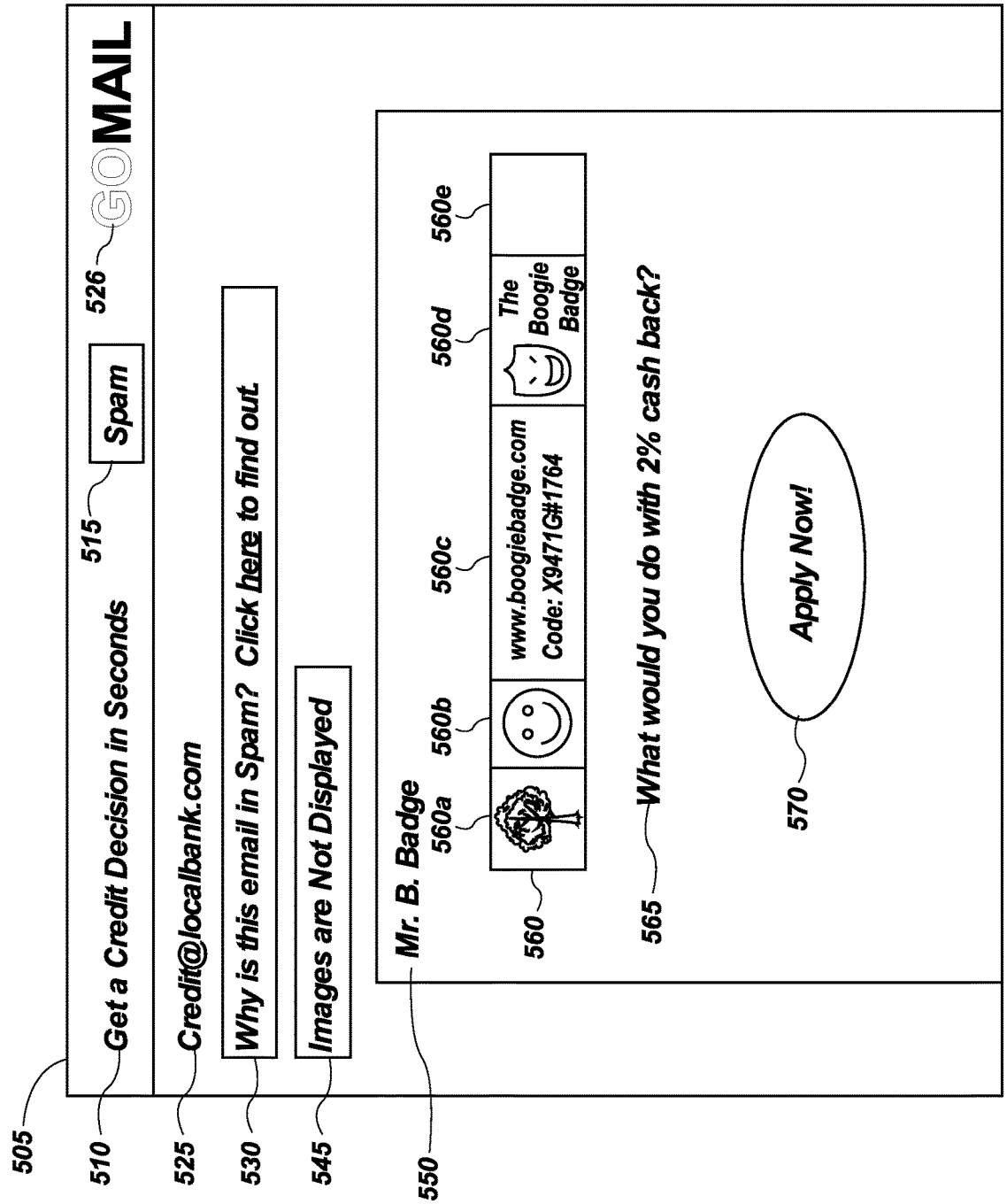
FIG. 5 illustrates an exemplary user interface showing a representation that the information contained within an email is from an authenticated and verified sender.

FIG. 5 illustrates an exemplary user interface 500 showing a representation that the information contained within an email 505 is from an authenticated and verified sender. Email 505 includes an email subject 510 identified as "Get a Credit Decision in Seconds." Email 505 is shown as existing in a "Spam" folder 515 on an email service 526, known as "GOMAIL." It should be noted that the specific techniques and implementations herein may be implemented across any email service, like GOMAIL, by using appropriate plug-ins for the various email services. Software plugins may be implemented by a web browser or an email provider, or any other software provider/service that facilitates transmission and reception of digital information between a sender and a recipient. Thus, notices to the user of authenticated or nonauthenticated content may be displayed within content of a web page or email content, an email header, a web browser header/toolbar, the email provider's code, or a stand-alone software interface as required by a particular service. Email 505 is further identified as having been sent by an entity 525 known as "Credit@localbank.com." The email service 526 may display information identifying why the email as been identified as spam at window 530 and indicate that some images in the email may not be displayed at window 545.

The content of the email identifies the recipient 550 as Mr. B. Badge. Server 120, shown in FIG. 1, for example, has authenticated this email using, for example, method 200 shown in FIG. 2 or system 400, shown in FIG. 4. Thus, since the email has been determined to be sent by an authenticated sender, server 120 interposes an information box 560 which includes a number of images into the email as a visual confirmation to the user that the email is authentic. For example, information box 560 includes a picture of a tree 560a, the recipient's chosen security image, a picture of the sender 560b, the keycode for the email 560c, a representation of the service's trademark 560d, and a representation of a QR code 560e identifying the transaction that has occurred (i.e., receiving an email). Since all of the information has been determined to be valid, using the foregoing systems and techniques, a user may simply identify that the content of the email is authentic and safe.

Email 500 may further include a written message 565 which, in this example, asks the recipient 550, Mr. B. Badge, what he would do with 2% cash back. Email 500 may further provide interactive elements 570 which allow a user to connect to the sender's suggested website which, in this case, is a website that allows Mr. B. Badge to apply for a credit card that offers 2% cash back. Thus, even though the subject matter of the email may be less than desirable for at least some people, recipients may be assured that the email is at least verified, authentic, and safe.

Figure 6:
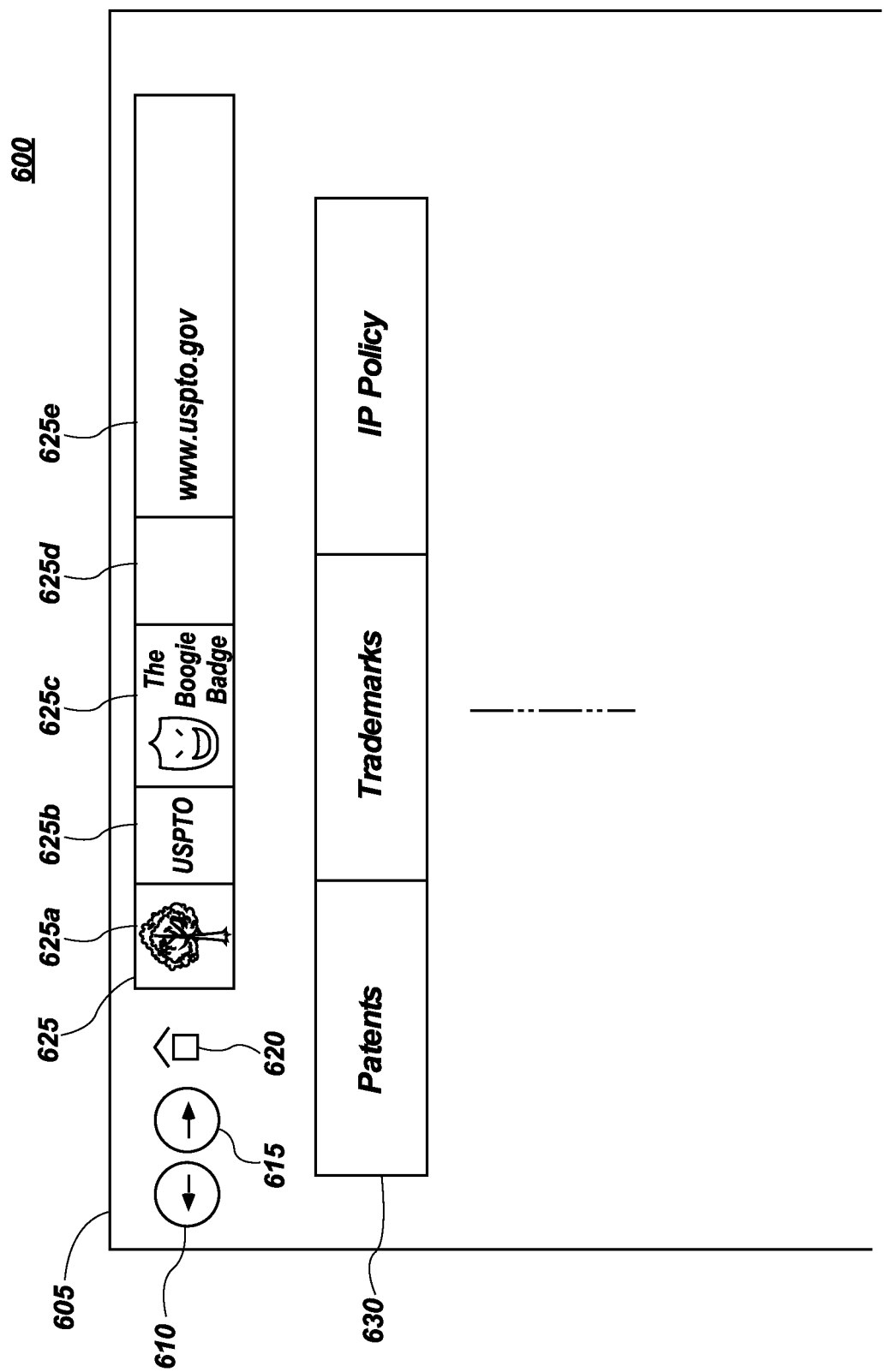
FIG. 6 illustrates an exemplary user interface of a web browser showing a representation that a website is an authenticated and verified website.

FIG. 6 illustrates an exemplary user interface 600 of a web browser showing a representation that a website 605 is an authenticated and verified website. The web browser providing user interface 600 may include standard controls such as back button 610, forward button 615, and a home button 620. The web browser providing user interface 600 may further include an address bar 625 which provides the user with visual indications that a particular website is an authenticated and verified website. For example, address bar 625 may include a representation of the user's chosen security image 625a, which in this example is the aforementioned image of a tree. Address bar 625 may further include a representation of a logo or identifier 625b associated with the owner of a particular website which in this case is "USPTO." Address bar 625 may further include a representation of the service's trademark 625c, and a representation of a QR code 625d identifying the transaction that has occurred (i.e., visiting the website via a web browser). Address bar 625 may include a URL (uniform resource locator), also known as a website address, 625e. Since all of the information on the website has been determined to be valid, using the foregoing systems and techniques, a user may simply identify that the content of the email is authentic and safe using the visual representations in address bar 625. Website 605 may further include content 630.

Figure 7A:
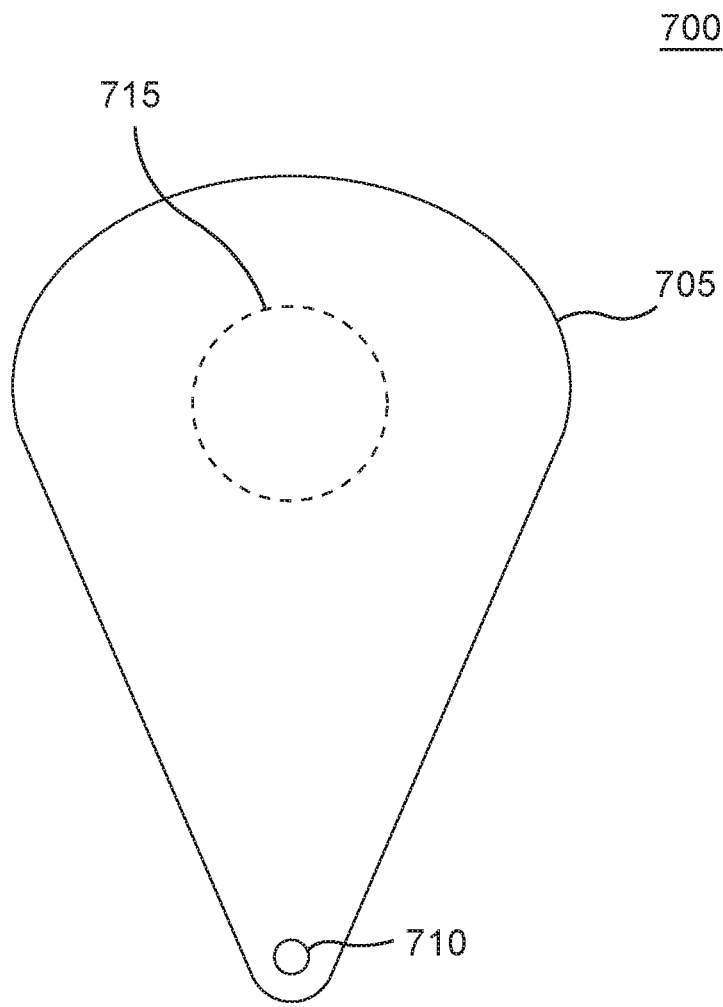
FIG. 7a illustrates another exemplary embodiment of a badge that provides RFID/NFC communication functionality.

FIG. 7a illustrates another exemplary embodiment of a badge 700 that provides RFID/NFC communication functionality. Badge 700 may be implemented to include a body 705, a pivot point 710, and an RFID/NFC device 715. Badge 700 may use RFID/NFC device 715 to authenticate a particular bearer of badge 700 in a manner that meets the conditions for authentication to the systems and devices described herein. RFID/NFC device 715 may be implemented as an embedded RFID chip or an RFID sticker, and/or may include a printed matrix barcode in any combination. RFID/NFC device 715 may contain and operate with suitable circuitry to enable RFID communication or NFC communication (e.g., an NFC chip) as desired by a particular implementation.

Badge 700 may be constructed using a metallic material since metallic materials prevent unwanted radio scanning of RFID devices. In other words, body 700 may be substantially surrounded by metallic material to an extent that radio scanning devices are not able to surreptitiously or covertly receive a signal from an RFID/NFC device 715. Exemplary metallic materials may be aluminum, stainless steel, titanium, and other metals. In some cases, metallic materials may be substituted with plastic, wood, or other materials that include devices that prevent unintended access to RFID/NFC device 715. For example, a Faraday cage may be implemented in a plastic or wood device to prevent unwanted signals from penetrating a case constructed from plastic or wood, for example. However, metallic materials are preferable to implement body 705 because metallic materials naturally prevent unintended access to RFID/NFC device 715 as metallic materials prevent electromagnetic signals from passing through them (e.g., metallic shielding), thereby eliminating a security risk by simple use of metallic materials to implement body 705. In one embodiment, stainless steel is a preferred material due to its strength, durability, and appearance characteristics.

Figure 7B:
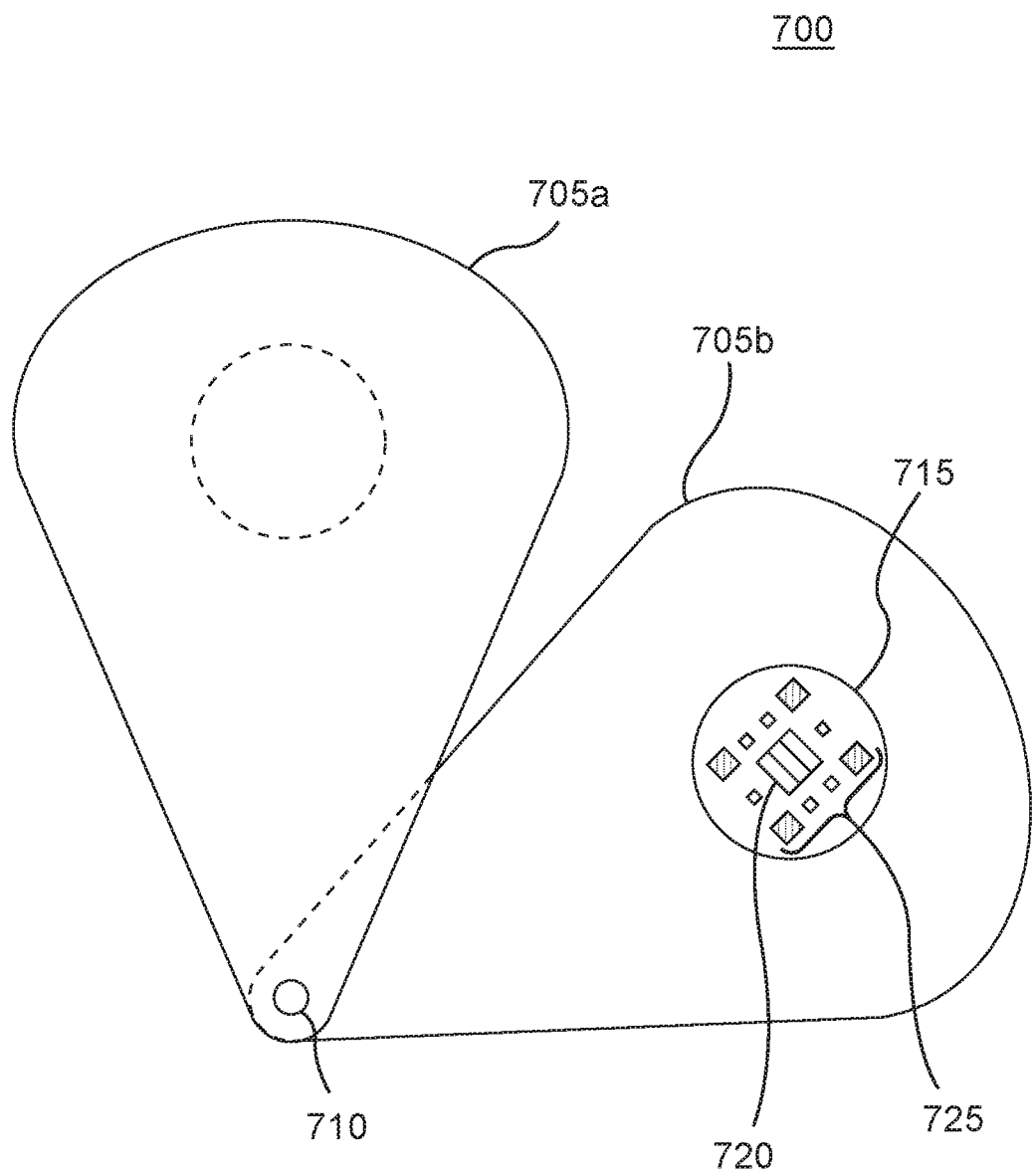
FIG. 7b illustrates the exemplary embodiment of a badge in FIG. 7a in a communication configuration.

Body 705 may comprise symmetric pieces of metallic materials that are of a similar size and shape. For example, as shown in FIGS. 7a and 7b, body 705 is a tear drop shape. However, any shape or size may be used. For example, body 705 could be implemented in a size that is consistent with a standard business card or a credit card. Body 705 may include a top 705a and bottom 705b, as shown in FIG. 7b. Body 705 may be separated by pivoting the top 705a and bottom 705b portions of body 705 away from each other as shown in FIG. 7b, around pivot point 710. It is to be noted, however, that pivot point 710 may provide an ability for top 705a and bottom 705b portions of body 705 to pivot in a single plane, such as a conventionally understood "X" plane in a cartesian sense. Pivot point 710 may also be implemented as a hinge that allows top 705a and bottom 705b portion of body 705 to separate from each other in a "Y" plane, as conventionally understood in cartesian geometry (in a direction that is 90 degrees from a plane identified as the "X" plane). More simply put, top 705a and bottom 705b portion of body 700 may separate from each other by sliding or folding away from each other. In this manner, RFID/NFC device 715 may be protected and concealed while contained within body 705 but temporarily exposed to allow authentication at an appropriate time, and then re-concealed within body 705.

RFID/NFC device 715 may be implemented as an antenna that may communicate while attached to a metal surface, such as body 705. Alternatively, RFID/NFC device 715 may be insulated by an insulation material (not shown), such as a sticker, that insulates RFID/NFC device 715 from body 705. RFID/NFC device 715 may include an antenna 720 which may interface with an RFID/NFC reader device, such as those disclosed herein. RFID/NFC device 715 may alternatively, or additionally, include a matrix barcode 725 for also providing an authentication matrix barcode to other devices, such as those devices disclosed herein. RFID/NFC device 715 may store authentication information for a particular user and communicate that information to systems and devices disclosed herein at the discretion of the user.

FIG. 8 illustrates another embodiment of a badge 800 that provides RFID/NFC communication functionality. Badge 800 provides a body 800 which comprises a first outside layer 805a, a second outside layer 805b, and an intermediate layer 805c disposed between first outside layer 805a and second outside layer 805b. As previously discussed, body 805 may be constructed from metallic materials such as aluminum, stainless steel, titanium, and other similar metals. Although other materials such as plastic and wood may also be used to form body 800. Metallic materials are, however, preferable to implement body 805 because metallic materials naturally prevent unintended access to RFID/NFC device 815 as metallic materials prevent electromagnetic signals from passing through them, thereby eliminating a security risk by simple use of metallic materials to implement body 805. In one embodiment, stainless steel is a preferred material due to its strength, durability, and appearance characteristics. Body 805 may include an access port 810 which may be disposed as a hole in first outside layer 805a. Access port 810 may allow RFID/NFC device 815 to be accessed by a user's finger and slid in and out of body 800, as will be further discussed below.

As shown in FIG. 8, RFID/NFC device 815 may include an antenna 820 as well as a matrix barcode 825 and may be disposed on a strip 830 in a manner similar to that shown and described above with respect to FIG. 7. RFID/NFC device 815 may, like RFID/NFC device 715 shown in FIG. 7, serve to receive and transmit information stored in RFID/NFC device that may be used to authenticate or identify a person. Strip 830 may be formed using metallic materials, plastic materials (in all suitable forms), and other materials. Strip 830 may be dimensionally substantially equal in length to a length of body 805. In other words, an end of strip 830 may be inserted into body 800 up to the point that strip 830 is fully contained within body 800. As shown in FIG. 8, RFID/NFC device 815 may be disposed closer to one end of strip 830 than another end of strip 830. In this manner, strip 830 may be exposed through access port 810 while maintaining RFID/NFC device 815 between first outside layer 805a and second outside layer 805b and otherwise unexposed to and protected from transient electromagnetic signals. Accordingly, when installed within body 800, strip 830 may be accessible through access port 810 which allows a user to contact strip 830 with a finger and, using friction created between the user's finger and strip 830, push strip 830 up such that RFID/NFC device 815 is temporarily exposed for authentication or identification purposes and/or for interfacing with other elements of the system described herein. When authentication or identification operations have been accomplished, strip 830 may be drawn back into body 800 by the user's finger through access port 810. In this manner, RFID/NFC device is shielded from electromagnetic signals but easily accessible for authentication and/or identification purposes.

Figure 9A:
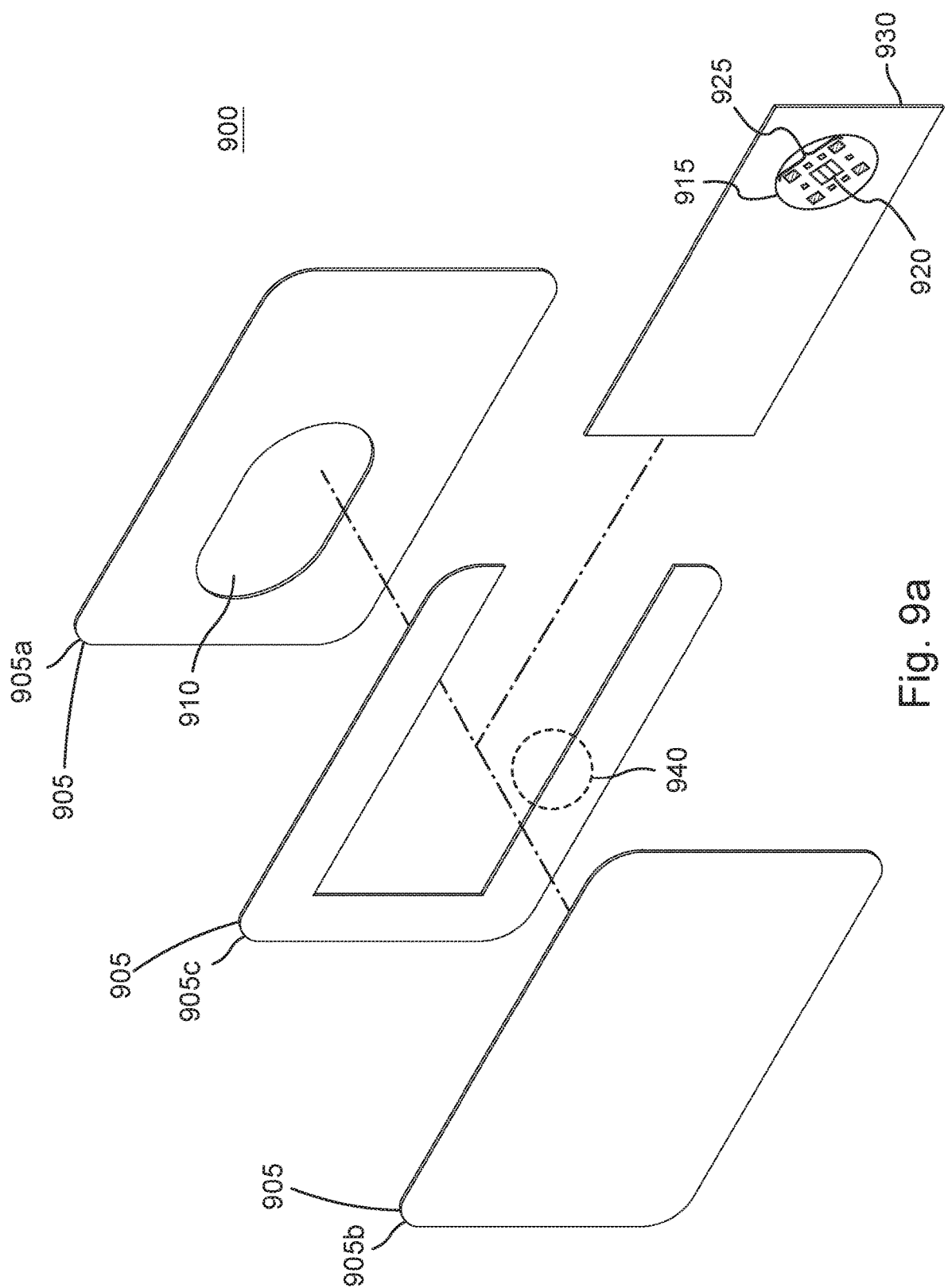
FIG. 9a illustrates the exemplary embodiment of a badge in FIG. 8 as an exploded view.

FIG. 9a illustrates the exemplary embodiment of badge 800 shown in FIG. 8 as an exploded view of badge 900. Badge 900 includes a body 905 which comprises a first outside layer 905a, a second outside layer 905b, and an intermediate layer 905 which is disposed between first outside layer 905a and second outside layer 905b. As previously discussed, body 905 may be constructed from metallic materials such as aluminum, stainless steel, titanium, and other similar metals. Although other materials such as plastic and wood may also be used to form body 900. Metallic materials are, however, preferable to implement body 905 because metallic materials naturally prevent unintended access to RFID/NFC device 915 as metallic materials prevent electromagnetic signals from passing through them, thereby eliminating a security risk by simple use of metallic materials to implement body 905. In one embodiment, stainless steel is a preferred material due to its strength, durability, and appearance characteristics. Body 905 may include an access port 910 which may be disposed as a hole in first outside layer 905a. Access port 910 may allow RFID/NFC device 915 to be accessed by a user's finger and slid in and out of body 900, as will be further discussed below.

As shown in FIG. 9, RFID/NFC device 915 may include an antenna 920 as well as a matrix barcode 925 and may be disposed on a strip 930 in a manner similar to that shown and described above with respect to FIG. 8. RFID/NFC device 915 may, like RFID/NFC device 715 shown in FIG. 7, serve to receive and transmit information stored in RFID/NFC device 715 that may be used to authenticate or identify a person. Strip 930 may be formed using metallic materials, plastic materials (in all suitable forms), and other materials. Strip 930 may be dimensionally substantially equal in length to a length of body 905. In other words, an end of strip 930 may be inserted into body 900 up to the point that strip 930 is fully contained within body 900. As shown in FIG. 9a, RFID/NFC device 915 may be disposed closer to one end of strip 930 than another end of strip 930. In this manner, strip 930 may be exposed through access port 910 while maintaining RFID/NFC device 915 between first outside layer 905a and second outside layer 905b and otherwise unexposed to and protected from transient electromagnetic signals. As shown in FIG. 9a, intermediate layer 905c may include a recess identified by inset 940, which is configured to receive strip 930, as will be discussed in more detail below. Intermediate layer 905c is dimensionally sized and configured to receive strip 930 in each dimension.

Accordingly, when installed within body 900, strip 930 may be accessible through access port 910 which allows a user to contact strip 930 with a finger and, using friction created between the user's finger and strip 930, push strip 930 up such that RFID/NFC device 915 is temporarily exposed for authentication or identification purposes and/or for interfacing with other elements of the system described herein. When authentication or identification operations have been accomplished, strip 930 may be drawn back into body 900 by the user's finger through access port 910. In this manner, RFID/NFC device 915 is shielded from electromagnetic signals but easily accessible for authentication and/or identification purposes. Accordingly, badge 900 may include two or three layer bodies to allow temporary exposure of the RFID/NFC communication device.

Figure 9B:
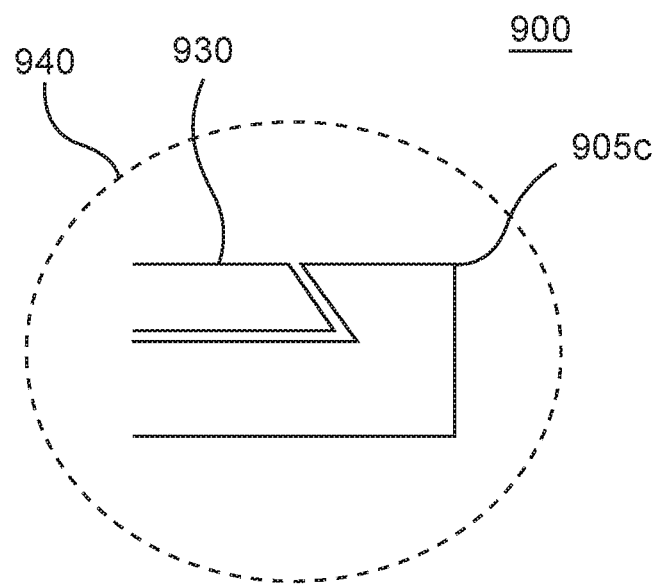
FIG. 9b illustrates an inset portion of FIG. 9b showing a connection between an RFID/NFC badge and a housing.

FIG. 9b illustrates a portion of badge 900, as shown as inset 940 in FIG. 9a. Strip 930 may be configured with beveled edges around the circumference of strip 930 or at least three sides of strip 930 that may contact badge 900 when disposed within badge 900. Further, intermediate layer 905c may be beveled with a bevel angle that corresponds to the beveling angle of the beveled edges of strip 930. In this manner, or using alternatives, a track or guide may be disposed within solely intermediate layer 905c to ensure that strip 930 slides along the track or guide disposed in intermediate layer 905c. Strip 930 may be fitted with corresponding track couplers (e.g., beveling angle) or other structure such that strip 930 slides in and out of body 930 based on interaction from the user with strip 930 and body 900.

Figure 10:
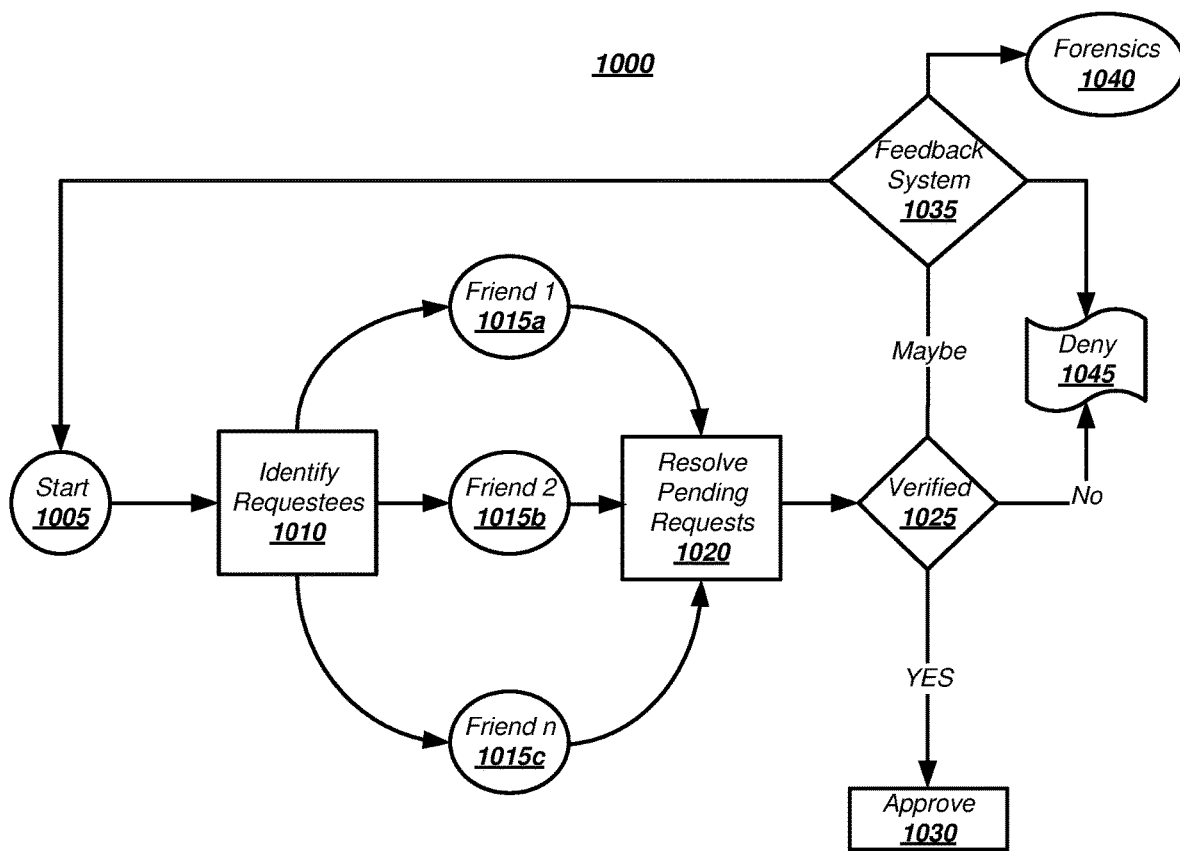
FIG. 10 illustrates another embodiment of a method for authenticating a user to the system.

FIG. 10 illustrates another embodiment of a method 1000 for authenticating a user to system, 100, shown in FIG. 1. Method 1000 begins at step 1005 with a user requesting authentication in a relationship based authentication scheme. Upon receiving a request from the user at step 1005, a server, such as server 120, shown in FIG. 1, may identify a one or more requestees who may be able to provide a relationship based identification of the user at step 1010. At this point, server 120 may determine who to send an identification request to based on the circumstances at the time the request is made in step 1005. In this example, the request may include a photo, a video, an audio, or a combination of video and audio request for verification. Further, circumstances may include a relationship status of a particular person (e.g., a relation such as a mother, father, sister, brother, son, daughter) to the user, which of these people are currently online and logged into server 120, the priority or urgency of the requested verification, historical response speed of the relation, willingness (in terms of frequency of verifications) of the relation to provide identifications of other people, if the request is personal or business based, and any other consideration that would facilitate identification of a requestee who can verify the user. Each of these circumstances may be factors that may be used in selecting a particular person or people as verification request requestees, as will be discussed below.

Once the particular person or people are identified based on the circumstances and likelihood of obtaining a verification, a verification request may be sent by server 120 to one or more relations, identified in FIG. 10 as friend 1 1015a, friend 2 1015b, and friend n 1015n. As implied, any number of requests may be transmitted from server 1015 to any number of requestees (e.g., Friend n). Server 120 may identify a number of requestees to whom a verification request should be sent based on a calculated likelihood (based on the foregoing factors) that a verification will occur in less than a predetermined amount of time. For example, server 120 may determine that if Friend 1 1015a and Friend 2 1015b receive a verification request, there is a 90% likelihood that the user will be identified in less than one minute. A user may have full customized control over how server 120 determines which person or people should be preferred to provide a verification in response to a verification request.

At step 1020, one or more of the verification requests transmitted to friends 1015a-1015n may be accepted which causes server 120 to resolve pending requests sent to other users. In a preferred embodiment, server 120 may receive a first response and transmit cancellation notifications to all other requestees. However, because of delays or interruption in Internet connectivity, each request may require further processing to terminate or resolve additional requests. The verification response received by server 120 at step 1025 may be a "yes" which results in immediate approval and verification at step 1030. Alternatively, the verification response received by server 120 at step 1025 may be a "maybe" at which point server 120 proceeds to perform an analysis of the user verification request at step 1005 at step 1035 with a feedback system. Feedback system 1035 may look at forensics 1040 associated with the request. For example, server 120 may analyze behavioral biometrics, keyboard pattern recognition, application usage, smart phone usage, and login/access behaviors, to determine if the request made at step 1005 is consistent with the user's known behavior. For example, has the user logged in at a particular time before, or frequently or other behavioral biometrics.

If feedback system 1035 of server 120 determines that fraud is likely based on unusual behavioral biometrics, the user verification request may be denied at step 1045. If feedback system 1035 of server 120 determines that the behavioral biometrics are consistent with a user verification request (or unrecognizable), the request may be reinitiated at step 1005 to identify other requestees in an attempt to obtain a more positive verification or give the user an opportunity to provide a better video or audio sample. Lastly, if the user is not verified at step 1025, e.g., one of friends 1015a-1015n indicate that the user is not who the user purports to be, the user verification request is denied at step 1045.

Figure 11:
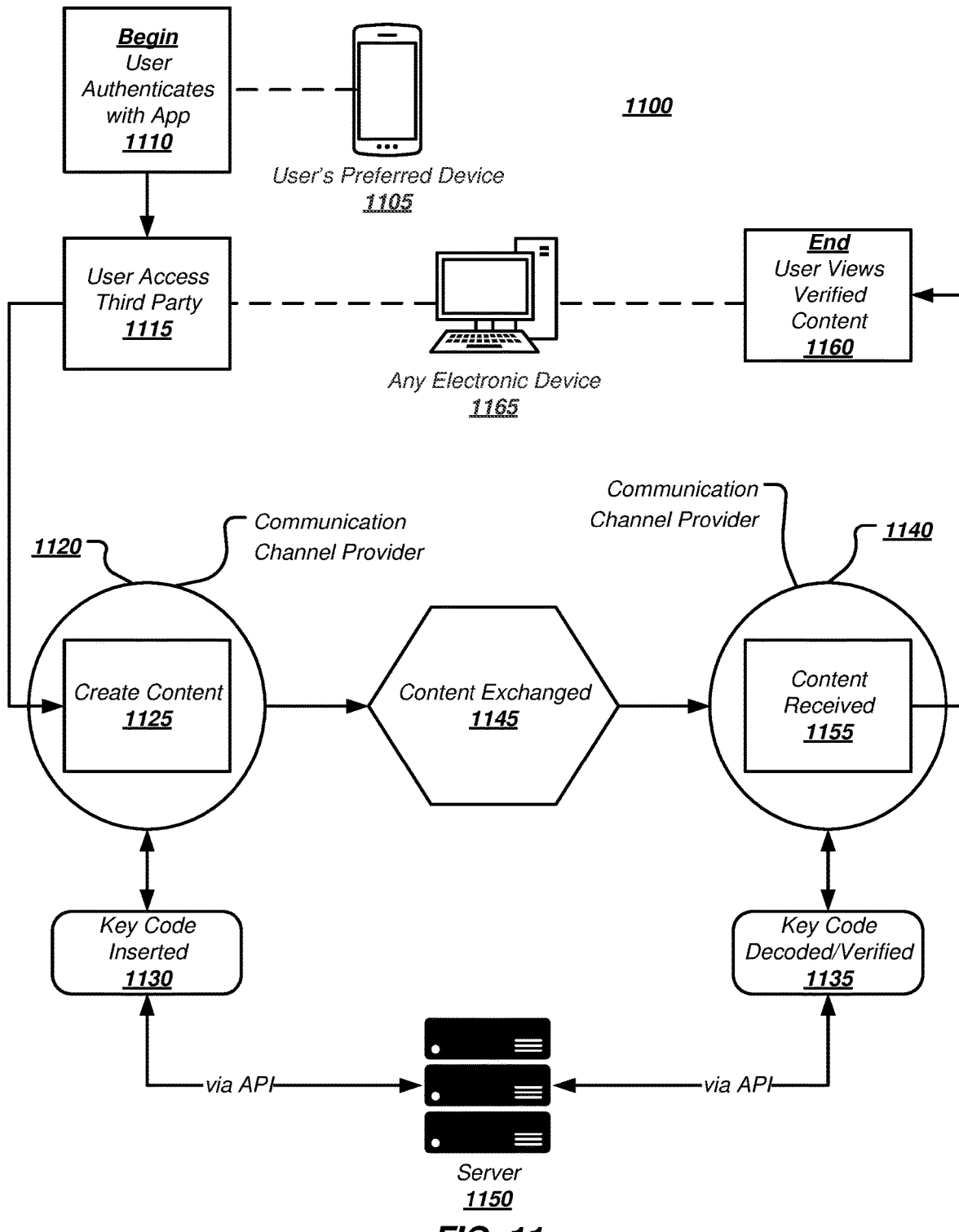
FIG. 11 illustrates a system for providing verified content.

FIG. 11 illustrates a system 1100 for providing verified content. System 1100 may include a user device 1105 which may, as shown in FIG. 11 be a smart phone, but may also be any other device described herein. A user may use user device 1105 to interface with server 1150 by logging on to the system at step 1110 using any of the techniques and processes discussed above (e.g., relationship based verification). Once authenticated, a user may obtain access to a third party communication provider 1115. A third party communication provider may provide a service, such as email, telephone, VOIP, text messaging, app-to-app messaging, server to server messaging, web logins, or face-to-face meetings.

In one embodiment, a user, once provided with access at step 1115 may provide content 1125 through communication channel provider 1120. Examples of providing content 1125 through a communication channel provider 1120 may include sending an email through an email service provider, providing voice input to a telephone over a telephone network, constructing and sending a text message over a data network, etc. Each element of content may receive a digital badge key code or a private key from server 1150 and insert 1130 the digital badge key code into content 1125. At the same time, server 1150 may provide a corresponding decoded/verified digital badge key code 1135 to the communication channel provider 1140. The private key may be an end-to-end encryption throughout the communication channel, and can provide end-to-end encryption and the private key remains hidden through the communication channel. At this point, content 1125 may be exchanged from user device 1105 at 1145 and received 1155 by the communication channel provider 1140. Once received, the content is verified by comparison of the digital badge key code 1130 and ensure it matches the decoded/verified digital badge keycode 1135. If the content is verified, the content is verified and made available to the intended recipient or recipients as authenticated content at 1160. It should also be noted that any number of electronic devices 1165 may be used by different users at any point in system 1100, including custom built hardware devices such as automated teller machines, identity verification stations, and other devices.

Various exemplary embodiments of this system are described below. In one embodiment, an automatic digital verification may be performed between an author/publisher and a recipient/viewer. In this embodiment, a company's email server may authenticate its identity method 200, for example. The company may create email content and receive a one time send keycode or HTML script for email to send the email over the server. Alternatively, a user personally authenticates with server 120, creates content (an email, a product review, a website post, a blog post, a video, etc.), and authentication information is automatically added to a web browser by an extension, desktop software plug-in, or other integration with server 120. The user may then transmit the content to its intended destination.

A recipient of the content may verify the sender's keycode with server 120 to determine whether or not the content is authentic. Similarly, an individual may authenticate with server 120 via method 200 or badge 105, for example. Server 120 may intercept the content and verify the recipient's keycode and the sender's keycode and, in response, transmit the user's personalized security image with the content.

In another embodiment, an assisted digital verification may be performed for an author or a publisher. In this embodiment, a user may authenticate with server 120 using method 200 or badge 105, for example. The user may create content and append the content with badge information or a keycode by, for example, right clicking on the content and adding badge information if suitable browser extensions or desktop software plugins are implemented for integration into a web browser. Once the badge information or keycode information is appended, the user may transmit or publish the content.

In another embodiment, a manual digital verification may be performed between an author/publisher and an individual person. For example, an individual person associated with a company may authenticate with server 120 by logging into an account associated with server 120 using, for example, information from badge 105. The person may create content and copy/paste badge information or keycode information into the content and transmit or publish the content. For a website, a user may authenticate with server 120 by method 200 or via badge 105, for example. The user may create content and add keycode information to the content through limited functionality based on the user's web account that is associated with server 120. The user may then publish the content on the website for public viewing.

A recipient/viewer of the content may optionally register and authenticate with server 120 to access the content. The content may be verified by the user copy/pasting a keycode into a website provided via server 120 which allows unregistered users to verify that content provided via the website is registered with server 120. The keycode in this example may be limited in time and scope and expire after a single use or within a certain amount of time. However, once the user has registered with the server, the user may view a personalized verification transmitted from the website provided via server 120 that the content is verified and authenticated.

In another embodiment, a person to person verification in the physical world may be accomplished by means of system 100, shown in FIG. 1. For example, two persons who wish to be mutually authenticated/verified may be termed an "identified" person and an "identifier" person. In one embodiment, an identified person may access a mobile application which provides a user access to a stored identification in server 120 and queues the user's device, such as electronic device 115 to prepare for NFC communications, displays a QR code for a session ID received from server 120 and may display a user's photo, name, company affiliation, and other information depending on the identified user's settings. The identifier, on the other hand, may use an electronic device, such as electronic device 115, in this implementation a mobile smart phone, with the same mobile app running to tap the identified person's phone, or optionally capture the QR code of the identified person's phone to supply the identifier with the identified person's identification information.

In another embodiment, a remote person to person verification in the physical world may be accomplished by means of system 100, shown in FIG. 1. For example, an identified person may authenticate with server 120 using any of the techniques described herein and access a mobile application, a web browser, or a software integration tool, and access a tool that allows the identified person to show an identification to a remote person. The identified person may optionally request the identifier's identification information also. The identified party may enter the identifier's username, email address, or phone number to access the information. For example, the identifier person may authenticate with server 120 using any of the techniques described herein and may similarly access a mobile application, a web browser, or a software integration tool and access a tool that allows the identifier person to show an identification to a remote person. The identifier person may optionally request the identifier's identification information as well.

In this manner various system users may connect with each other via an anonymous chat, social media forums, payment websites, business cards, or other digital connections.

In one example, a system for verifying an identity of a user may be provided. The system may comprise: a badge having a first side containing read only information and a second side containing read and write information; and a server for authenticating identity information provided by the badge.

In another example, a method for verifying an identity of a user may be provided. The method may comprise transmitting an identification request to one or more people within a user's contact list; requesting that the one or more people within the user's contact list verify the identity of the user; and verifying the identity of the user based on a response from the one or more people within the user's contact list.

In another example, verifying a user's identity may be performed by adaptive and/or artificial intelligence-based authentication techniques. Authentication may be based on one or more user configurable conditions and may be customized for particular services.

In another example, a device for storing identity information of a user may be provided. The device may comprise a first side containing read only identity information and a second side containing read/write identity information, wherein the information is accessible by NFC communication with the device.

In another example, a system may be provided which allows digital content to be transmitted from one user computer to another user computer in an encrypted state which may or may not include an encrypted keycode identifying the sender and receiver of the encrypted content. In one embodiment, such a transmission of encrypted content may be seamless from the perspective of a user recipient of the encrypted content.

In another example, a badge may be provided which includes a body containing an RFID device or a NFC device. The body may metallically shielded and allow the RFID device or NFC device to be temporarily exposed by a user by user interaction with the body. The RFID or NFC device may contain authentication or identification information for the user.

In another example, a badge may further include a matrix barcode which contains authentication or identification information.

In another example, a badge may include a body with a first layer, a second layer, and a third layer, wherein the third layer includes a track which receives an RFID/NFC strip which has a corresponding track coupler such that the RFID/NFC strip slides in and out of the body based on user interaction with the strip and the body.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims, if any.

Other embodiments will be apparent to those skilled in the art from consideration of the specification and practice of the disclosure disclosed herein. It is intended that the specification and examples be considered as exemplary only, with a true scope and spirit of the invention being indicated by the claims, if any.

What is claimed is:

1. A method, comprising:
   receiving, by a processor, an identity verification request based on input provided by a user to be verified;
   receiving, by the processor, a facial and audio recognition sample from the user, wherein the facial and audio sample are from a person using a user device;
   transmitting, by the processor, the facial and audio recognition sample to one or more third party entities with a request to verify that the facial and audio recognition sample represents the user, wherein the one or more third party entities can witness a human characteristic of the user and prompting the one or more entities to verify the user;
   receiving, by the processor, an indication from at least one of the third party entities that the user is verified;
   verifying, by the processor, that the user who provided the facial and audio recognition sample is the person the user purports to be.

2. The method of claim 1, further comprising:
   transmitting, by the processor, a verification of the user to a third party.

3. The method of claim 1, further comprising:
   receiving, by the processor, an iris scan from the user.

4. The method of claim 1, further comprising:
   receiving, by the processor, a fingerprint scan from the user.

5. The method of claim 1, further comprising:
   receiving, by the processor, a writing sample from the user.

6. The method of claim 1, further comprising:
   performing, by the processor, voice recognition on the facial and audio recognition sample.

7. Method of claim 1, further comprising:
   performing, by the processor, a facial recognition on the facial and audio recognition sample.

8. The method of claim 1, further comprising:
   identifying, by the processor, one or more third party entities based on circumstances.

9. The method of claim 8, further comprising:
   selecting, by the processor, the one or more third party entities based on a likelihood of obtaining a positive verification.

10. The method of claim 1, further comprising,
    receiving, by the processor, a customized verification process from the user, the verification process including one or more of fingerprint scanning, signature scanning, electrocardiogram scanning, iris scanning, vein recognition, ear scanning, palm scanning, voice recognition, face recognition, video recognition, thumb print scanning, metal key card, intermittent microphone-voice recognition, intermittent camera-face recognition, keyboard pattern recognition, smart phone application usage, smart phone usage, and login or access behaviors.

11. The method of claim 1, wherein the facial and audio recognition sample is a video.

12. The method of claim 11, wherein the facial and audio recognition sample is a live video.

13. The method of claim 12, wherein the facial and audio recognition sample is a recorded video.

14. The method of claim 1, wherein the facial and audio recognition sample includes a picture.

15. The method of claim 1, wherein the facial and audio recognition sample includes a voice recording.

16. The method of claim 1, wherein verifying further includes identifying one or more behavioral biometrics.

17. A method, comprising:
    receiving, by a processor, an identity verification request based on input provided by a user to be verified;
    receiving, by the processor, a facial and audio recognition sample from the user, wherein the facial and audio sample are from a person using a user device;
    transmitting, by the processor, the facial and audio recognition sample to one or more third party entities with a request to verify that the facial and audio recognition sample represents the user, wherein the one or more third party entities can witness a human characteristic of the user and prompting the one or more entities to verify the user;
    receiving, by the processor, an indication that the user in the facial and audio recognition sample is unrecognizable;
    examining, by the processor, the behavioral biometrics of the identity verification request;
    requesting, by the processor, a second facial and audio recognition sample from the user, transmitting, by the processor, the second facial and audio recognition sample to the one or more third party entities;

receiving, by the processor, an indication from at least one of the third party entities that the user is verified; and verifying, by the processor, that the user who provided the facial and audio recognition sample is the person the user purports to be.

18. The method of claim 17, wherein the first facial and audio recognition sample includes a picture and a voice recording.

19. The method of claim 18, wherein the second facial and audio recognition sample includes a video with an audio component.

20. The method of claim 17, further comprising:
transmitting, by the processor, a verification of the user to a third party.

\* \* \* \* \*